Jan. 24, 1928.
M. TRÉNEL
1,657,421
APPARATUS FOR THE ELECTROMETRIC DETERMINATION OF HYDROGEN ION CONCENTRATION
Filed Nov. 19, 1924
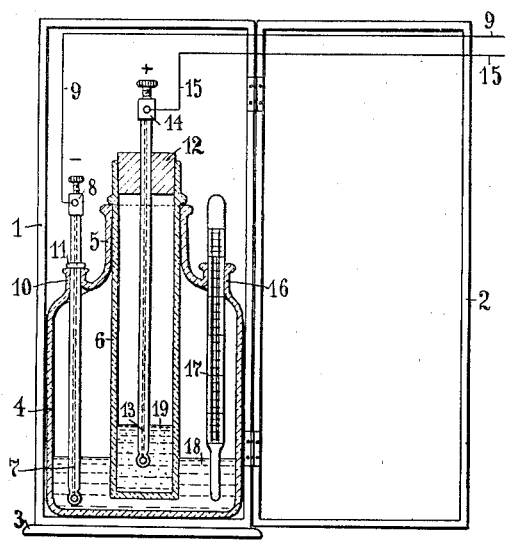
Fig. 1.
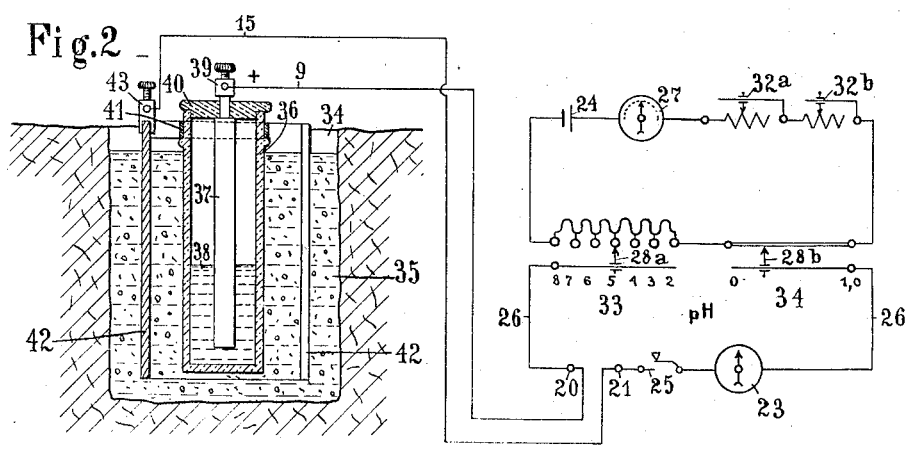
Inventor
Max Trénel
By Marks & Clerk
Attys.

Patented Jan. 24, 1928.

1,657,421

UNITED STATES PATENT OFFICE.

MAX TRÉNEL, OF BERLIN-DAHLEM, GERMANY.

APPARATUS FOR THE ELECTROMETRIC DETERMINATION OF HYDROGEN ION CONCENTRATION.

Application filed November 19, 1924, Serial No. 750,944, and in Germany December 6, 1923.

This invention has reference to novel and improved apparatus for effecting the determination of the concentration of hydrogen ions by electrometric methods, thus for example of the acidity or alkalinity of substances or solutions. The determination of the acidity of solutions is effected in practice as a rule by colorimetric methods or color observations which are substantially based upon the change in color of so-called indicators which have been calibrated by electrometric methods. However, the utilization of the electrometric method has been restricted to work in the laboratory heretofore on account of the delicate and complicated apparatus required. The method is substantially based upon the fact that the concentration of the acid, designated $c_1$ is determined by the potential which is produced by an unattackable, hydrogen-saturated electrode, for instance of platinum or carbon, as compared with an electrode of the same description immersed into a solution of known concentration $c_2$ in accordance with the equation $$\pi = \delta \log \frac{c_1}{c_2}$$

in which $\pi$ indicates the electric potential and $\delta$ is a constant factor depending upon the temperature.

Hydrogen saturated electrodes are well known in the art. They consist usually of platinum, gold or carbon, saturated with hydrogen either by bubbling a stream of hydrogen past the electrode or maintaining the electrode in a solution containing quinhydron.

It is a well known fact that the hydrogen in these electrodes is in the metallic state and that it may be replaced by quinhydron from which hydrogen splits off in solution according to the equation $$C_6H_4(OH)_2 = C_6H_4O_2 + H_2.$$

In order to eliminate the potential of diffusion it is usual to make use of an inert salt solution, and the electrode vessels are connected by syphons with a third vessel containing the inert salt solution and consequently with each other. In view thereof the various electrode vessels suggested for the purpose in question are of a more or less complicated construction, and on that account very liable to be broken, so that they have been practically unfit for utilization outside of the laboratory.

My invention is intended to obviate these difficulties, and in view thereof and in accordance with my invention a cell containing one of the hydrogen-saturated unattackable electrodes and forming a half cell is directly introduced into the substance under investigation, and the condition to be ascertained is determined by means of a galvanometer and by the use of a suitable measuring box, and is read off directly on two graduated scales. The second electrode is inserted directly into the substance under investigation and the potential difference between the two electrodes, which is a measure of the hydrogen-ion concentration is determined.

It is obvious, however, that it is also possible to introduce the liquid to be investigated into said cell, and to immerse the same into the liquid of comparison.

The bottom or the lower portion of the cell referred to may consist for instance of a diaphragm, such as porous porcelain.

The employment of a cell made of a finely porous material, particularly porcelain gives the advantageous result that the cell does not need to be freshly prepared in a series of tests. A cell of this description exhibits a measurable diffusion and compensation of concentration only after 3 or 4 days as appears from the following tabulation of tests with measurements of the concentration of hydrogen-ions at the end of different periods of time.

| Times. | $P_H$ |
|---|---|
| In the beginning | 6.97 |
| After 1 day | 6.97 |
| After 2 days | 6.97 |
| After 3 days | 6.96 |
| After 4 days | 6.92 |

By means of the new apparatus on account of its less complicated, compendious form, it is possible to determine the acidity by electrometric means of soils, coal, water, spent and waste liquors, fertilizers, physiological solutions, fermented liquors and the like outside of the laboratory.

Besides these investigations, observations may be effected for medicinal purposes (such as blood, urine, peptic juices and medicines); in biology plant juices, nourishing cultures, and liquors in the fermentation industries may be investigated in this manner. In the industrial arts generally the new apparatus according to this invention is applicable among other important uses to the determination of the acidity of any kind of solutions, such as for instance in electrolytic and galvanic solutions or precipitating baths, in the manufacture of artificial silk and may be put to various other uses. The apparatus is likewise used to advantage in the electrometric titration of turbid or colored solutions in which the usual dye or color indicators cannot be used. In agriculture the uses of the invention extend not only to the examination of the soil, particularly in regard to the amount of lime required in the soil, but also to the testing of fertilizers, and to the ascertaining of damages by smoke nuisance and to other modes of application.

The invention will be further described in connection with a description of a form of apparatus embodying the principles thereof, serving for the carrying out of the method, and shown by way of example on the accompanying drawing in which Figures 1 and 2 are representations of the apparatus in vertical section, Figure 2 further showing the electrical connections for effecting the measurement.

In the protecting box 1 which is provided with the door 2 and the bottom 3 a glass bottle 4 with three necks 10, 16, 5 is mounted. The central largest neck 5 is adapted for the reception of a half-cell 6 consisting of a porous porcelain cylinder and adapted to rest on the neck 5 of the bottle by means of an annular projection at its upper portion. Into the interior of the cylinder 6 of the cell the positive electrode 13 is immersed which is fitted into the perforated stopper 12 and to which the line wire 15 is connected by means of the pole clamp 14. The inner space of the cylinder 6 is charged either with the comparing liquid 19 or with the liquid it is desired to compare therewith, i. e. liquid 18. Into the neck 10 of the bottle 4 the negative electrode 7 is introduced which by means of the annulus 11 rests upon the upper rim of the neck 10. This electrode is connected to the line wire 9 by the terminal 8. Through the third neck 16 of the bottle the thermometer 17 is immersed into the liquid to be examined 18 or into the liquid of comparison in the said cylinder 6.

When it is desired to employ the apparatus directly in the field the casing 1, 2 and the bottle-shaped container 4 are left out and only the remaining porcelain battery 6 is employed which in Figure 2 is indicated at 36. By means of the cover 40 the electrode 37 is suspended, so as to be immersed into the liquid of comparison 38, and is connected to the line 9 by the pole clamp 39.

In the soil to be examined a hole 34 is provided in which the soil substance 35 is made into a paste with water and a hydrogen generator, such as quinhydron for instance, is added. The outer electrode 42 which has the form of an open cylinder is suspended from the battery 36 by means of the holder 41, and is connected to the line wire 15 by the clamp 43.

The wires 9 and 15 are connected to the terminals 20 and 21 of the measuring board shown in Figure 2, which is disposed with its accessories in a small portable box not shown. In Figure 2 the galvanometer is indicated at 23, and 25 is a current switch, 26 is the line leading from the two slide wires $28^a$ and $28^b$ to the galvanometer, and 27 is a milli-ammeter, 24 is a battery consisting of two cells, $32^a$ and $32^b$ are regulating resistances for the adjustment of the comparison voltage-tension in accordance with the prevailing temperature, 33 is the scale for the unit $P_H$ figures, 34 is the scale for the decimals. The milli-ammeter 27 permanently controls the constant value of the voltage-tension of comparison. The ammeter is moreover intended to provide means for taking the temperature factor into account. On its graduated scale red marks are provided which correspond to the different temperatures for which the $P_H$ values read off are used. The adjustment of the current strength corresponding to the prevailing temperature is effected by means of the rotary resistances $32^a$ and $32^b$.

The method of using the new apparatus is substantially as follows:—

If the apparatus shown in Figure 1 is employed, the porous porcelain cell 6 is filled with the liquid of comparison 19, i. e. the testing liquid, and the entire cell 6 is immersed into the liquid 18 to be examined in the manner shown in Figure 1. Then the pole clamps 8, 14 of the two electrodes 7, 13 are connected to the corresponding pole clamps 20, 21 of the measuring box by means of the wires 9 and 15. Thereupon, the stopping means of the galvanometer 23 is released, and by the rotation of the resistance knobs $32^a$ and $32^b$ the prevailing temperature is adjusted on the ammeter 27, and the compensation sliding wires $28^a$ and $28^b$ are rotated, until the gavanometer 23 remains at rest by operating the current switch 25 for such time as becomes necessary for the observation of the oscillation of the gavanometer 23. The accuracy of the measurement may be increased by impregnating the diaphragm before use with a solution of potassium-chloride or with a jelly saturated with such a salt, with agar-agar-starch for instance. The increased accuracy of the measurement is due to the improved annihilation of the potential of diffusion.

The procedure is the same, if the apparatus is to be used in the open field and with the employment of the arrangement shown in Figure 2 of the drawing. If the apparatus is to be used for example for the examination of the juices of a tree, a hole is bored in such tree, solid quinhydron is introduced into the bore, and then the battery-cell according to Figure 2 is introduced. It is obvious that the invention is susceptible of a great variety of other uses and applications, and it should be understood that it is not restricted to the particular apparatus hereinbefore described and shown by way of exemplification, except as set forth in the claims hereunto appended. In the appended claims by the term half-cell I mean to include the cup having a porous diaphragm or membrane together with standard solution contained in it and a standard electrode disposed therein. The term half-cell has a definite meaning in the art and is referred to in numerous books on physical chemistry. Broadly speaking, a half-cell consists of one electrode in contact with electrolyte. Such a half-cell is electrically connected with another half-cell containing another electrolyte and another electrode, the connection usually being made by what is termed a liquid junction. The two half-cells constitute the whole cell and by the use of a calibrated half-cell, it is possible to measure the hydrogen concentration of a liquid in the other cell electrically connected to the half-cell. Half-cells, broadly speaking, as stated are old, my invention relates to a particular construction of a half-cell.

I claim:

1. An electrometric half-cell for use in determining hydrogen ion concentrations and adapted to be brought in direct contact with the material whose hydrogen ion concentration is to be determined, said cell comprising a cup having a part forming a porous diaphragm or membrane and adapted to contain a standard solution, and a standard electrode disposed in said cell.

2. An electrometric half-cell for use in determining hydrogen ion concentrations and adapted to be brought in direct contact with the material whose hydrogen ion concentration is to be determined, said cell comprising a cup having a porous diaphragm or membrane forming the bottom of said cup and adapted to contain a standard solution, and a standard electrode disposed in said cell.

3. An electrometric half-cell for use in determining hydrogen ion concentrations and adapted to be brought in direct contact with the material whose hydrogen ion concentration is to be determined, said cell comprising a cup having a part forming a porous diaphragm, said diaphragm being impregnated with a solution of an alkali metal chloride, said cup being adapted to contain a standard solution, and a standard electrode disposed in said cell.

4. An electrometric half-cell for use in determining hydrogen ion concentrations and adapted to be brought in direct contact with the material whose hydrogen ion concentration is to be determined, said cell comprising a cup having a part forming a porous diaphragm, said diaphragm being impregnated with a gel containing alkali metal chloride and said cup being adapted to contain a standard solution, and a standard electrode disposed in said cell.

5. Apparatus for measuring hydrogen ion concentrations comprising a half-cell comprising a cup having a porous diaphragm or membrane and adapted to contain standard electrolyte, an electrode disposed in said cup, a second electrode to be inserted in the material whose hydrogen ion concentration is to be measured, means to measure the potential difference between said electrodes, and means to adjust the current to the prevailing temperature.

MAX TRÉNEL.